(12) United States Patent
Cha et al.

(10) Patent No.: US 11,503,268 B2
(45) Date of Patent: Nov. 15, 2022

(54) DEVICE AND METHOD FOR BROADCASTING VIRTUAL REALITY IMAGES INPUT FROM PLURALITY OF CAMERAS IN REAL TIME

(71) Applicant: ALPHACIRCLE CO., LTD., Seongnam-si (KR)

(72) Inventors: Dong Woo Cha, Seongnam-si (KR); Ta sik Chung, Seongnam-si (KR)

(73) Assignee: ALPHACIRCLE CO., LTD., Seongnam-si (KR)

( * ) Notice: Subject to any disclaimer, the term of this patent is extended or adjusted under 35 U.S.C. 154(b) by 0 days.

(21) Appl. No.: 17/827,225

(22) Filed: May 27, 2022

(65) Prior Publication Data

US 2022/0295035 A1 Sep. 15, 2022

Related U.S. Application Data

(63) Continuation of application No. PCT/KR2020/017154, filed on Nov. 27, 2020.

(30) Foreign Application Priority Data

Nov. 29, 2019 (KR) .......................... 10-2019-0156487

(51) Int. Cl.
*H04N 13/194* (2018.01)
*G02B 27/00* (2006.01)
(Continued)

(52) U.S. Cl.
CPC ....... *H04N 13/194* (2018.05); *G02B 27/0093* (2013.01); *G06F 3/013* (2013.01); *H04N 13/117* (2018.05)

(58) Field of Classification Search
None
See application file for complete search history.

(56) References Cited

U.S. PATENT DOCUMENTS

| 2018/0150994 A1* | 5/2018 | Foutzitzis | .......... H04N 5/23238 |
| 2020/0001883 A1* | 1/2020 | Jung | .................... G06V 20/597 |
| 2022/0285601 A1* | 9/2022 | Pendse | ................. G02B 27/017 |

FOREIGN PATENT DOCUMENTS

| KR | 1020150123605 A | 11/2015 |
| KR | 1020180137816 A | 12/2018 |

OTHER PUBLICATIONS

Office Action of KR 10-2019-0156487 dated Sep. 16, 2020.

* cited by examiner

*Primary Examiner* — Talha M Nawaz
(74) *Attorney, Agent, or Firm* — Dinsmore & Shohl LLP; Yongsok Choi, Esq.

(57) ABSTRACT

A real-time broadcasting device includes a plurality of image capturing units arranged to capture images at the same time in different directions from the same point; an image selection unit for comparing the angle of view covered by each of the plurality of image capturing units and the gaze direction of a user terminal, and selecting an image of the image capturing unit, among the plurality of image capturing units, capturing images corresponding to the gaze direction of the user terminal; an image transmission unit for transmitting virtual reality images captured by the image capturing unit selected by the image selection unit to the user terminal in real time; and a gaze direction reception unit for receiving feedback about which direction the gaze direction of the user terminal viewing the virtual reality images is, and transmitting same to the image selection unit.

2 Claims, 4 Drawing Sheets

(51) Int. Cl.
*G06F 3/01* (2006.01)
*H04N 13/117* (2018.01)

DEVICE AND METHOD FOR BROADCASTING VIRTUAL REALITY IMAGES INPUT FROM PLURALITY OF CAMERAS IN REAL TIME

CROSS-REFERENCE TO RELATED APPLICATIONS

This application is a continuation of International Application No. PCT/KR2020/017154 filed on Nov. 27, 2020, which claims priority to Korean Patent Application No. 10-2019-0156487 filed on Nov. 29, 2019.

TECHNICAL FIELD

The present disclosure relates to a device and method for virtual reality play.

BACKGROUND ART

Virtual Reality (VR) means a technology that provides an environment similar to the real world created by an artificial technology using a computer and the like.

360 VR images are images that cover all 360 degrees using a plurality of cameras, and a user who views it may feel a significant level of immersion as if the user were at the site of shooting the images.

360 VR images are produced by disposing the plurality of cameras to shoot in different directions, and then attaching the images shot by respective cameras to create an original image as if it were shot in 360 degrees at the same time. At this time, an editing process of connecting the images from the different directions shot by the plurality of cameras to look natural is called stitching.

The stitching technology is a technology to connect images shot by a plurality of cameras after correcting the focal distance and distortion to meet a criterion for a predetermined viewing angle and screen size. For accurate stitching, color information, position, and angle of images shot at edges of adjacent images must match, and corrections such as matching sharpness of the images caused by camera performance differences or matching vertical and horizontal lines of subjects are required.

However, there is a problem in that a considerable amount of time is required for correction and editing in order to precisely stitch a plurality of images as described above.

Therefore, in order to stream content that is being broadcast live as 360 VR images, the content cannot be broadcast in real time, and time delay occurs by at least time required for stitching.

Accordingly, the inventors have completed the present disclosure by performing research and development for a long time through trial and error in order to solve the above problem.

SUMMARY OF THE INVENTION

Technical Goals

An aspect of the present disclosure provides a device for broadcasting in real time without stitching VR images shot using a plurality of cameras disposed in different directions at the same position.

Although not explicitly described herein, other objects not specified will be additionally considered within the scope that may be easily inferred from the following detailed description and effects thereof.

Technical Solutions

According to an aspect of the present disclosure, there is provided real-time broadcasting device for VR images, wherein the device is for real-time broadcasting of VR images input from a plurality of cameras, including a plurality of image shooters disposed to shoot images in different directions from the same point at the same time; an image selector configured to compare a field of view covered by each of the plurality of shooters and a gaze direction of an user terminal to select an image of a shooter shooting an image corresponding to the gaze direction of the user terminal among the plurality of shooters; an image transmitter configured to transmit a VR image shot by the shooter selected by the image selector to the user terminal in real time; and a gaze direction receiver configured to receive feedback on which direction the gaze direction of the user terminal for viewing a VR image is, and transmit the gaze direction to the image selector, wherein the real-time broadcasting device is configured to implement real-time broadcasting of VR content by transmitting, to the user terminal, only the image of the shooter in which the gaze direction of the user terminal is included, without stitching a plurality of VR images shot from the plurality of shooters.

In a preferred example embodiment, the plurality of shooters may include N camera units disposed to shoot images in different directions from the same point at the same time, the N camera units may be configured to shoot a shooting field of view, which is a value obtained by adding a predetermined guard field of view to both sides of a temporary field of view obtained by dividing a total field of view covered by the N camera units by N, and a field of view shot by one camera unit may be set to be overlapped with the fields of view covered by other camera units adjacent to both sides by a predetermined field of view.

In a preferred example embodiment, the gaze direction receiver may be configured to receive a play field of view unique to the user terminal capable of being played and the user's gaze direction, and when one end of the play field of view enters a guard field of view included in a shooting field of view of a shooter currently broadcasting in real time as the gaze direction of the user terminal changes, the image selector may be configured to determine whether or not the one end of the play field of view meets a predetermined switching criterion and block the image of the shooter currently being broadcast in real time and switch the shooter such that an image of an adjacent shooter is transmitted if the one end of the play field of view satisfies a predetermined switching criterion.

According to a second aspect of the present disclosure, there is provided a real-time broadcasting method for broadcasting in real time using the real-time broadcasting device for VR images of claim 1, wherein the method is for real-time broadcasting of VR images input from a plurality of cameras, including (a) determining a shooting field of view shot by a camera unit included in a plurality of shooters; (b) transmitting an image which is being shot by a shooter matching a gaze direction of an user terminal among the plurality of shooter to the user terminal in real time; (c) receiving the gaze direction of the user terminal and a play field of view unique to the user terminal which is able to be played by the user terminal; (d) determining whether or not one end of the play field of view and a shooting field of view of a shooter currently broadcasting in real time satisfy a predetermined switching criterion as the gaze direction of the user terminal changes; and (e) blocking an image of the shooter currently being broadcast in real time and switching the shooter such that an image of an adjacent shooter is transmitted if the switching criterion is satisfied.

In a preferred example embodiment, in operation (a), the plurality of shooters may be set such that N camera units disposed to shoot images in different directions from the same point at the same time shoot a shooting field of view, which is a value obtained by adding a predetermined guard field of view to both sides of a temporary field of view obtained by dividing a total field of view covered by the N camera units by N, and operation (d) may include (d-1) determining whether or not one end of the play field of view enters a guard field of view included in a shooting field of view of a shooter currently broadcasting in real time as the gaze direction of the user terminal changes; (d-2) determining whether or not the one end of the play field of view meets a predetermined switching criterion when the one end of the play field of view enters the guard field of view; and (d-3) stopping determining whether the switching criterion is satisfied when the one end of the play field of view deviates from the guard field of view.

In a preferred example embodiment, operation (e) may include allowing image switching to be executed only in a key frame of the image of the shooter to implement frame synchronization between images before and after the switching when the switching of the shooter starts.

Advantageous Effects

According to example embodiments, it is possible to broadcast in real time without stitching VR images shot using a plurality of cameras disposed in different directions at the same position.

Therefore, it is possible to save equipment and time required for stitching a plurality of VR images.

Above all, according to example embodiments, it is possible to transmit VR content live because real time performance may be secured.

Although not explicitly described herein, effects expected by the technical features of the present disclosure may be treated as described in the specification of the present disclosure.

The accompanying drawings are exemplified as a reference for understanding of the technical idea of the present disclosure, and the scope of the present disclosure is not limited thereby.

DETAILED DESCRIPTION

When those skilled in the art determines that a known function related to the present disclosure is self-evident and may unnecessarily obscure the gist of the present disclosure, detailed descriptions thereof are omitted.

Figure 1:
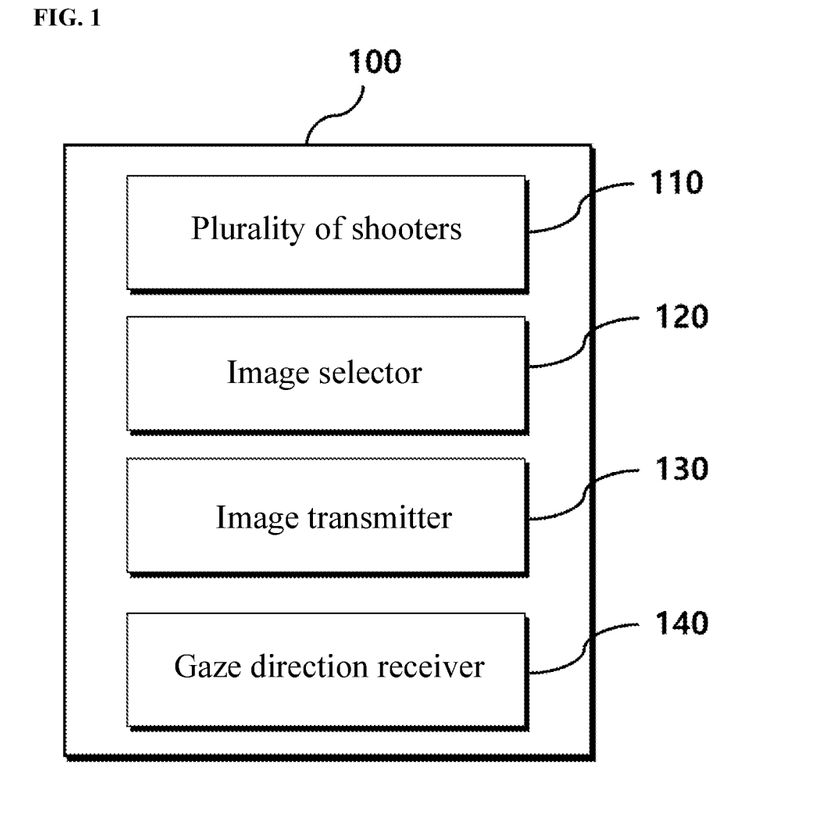
FIG. 1 is a diagram illustrating a preferred example embodiment of a real-time broadcasting device according to the present disclosure.
Figure 2A:
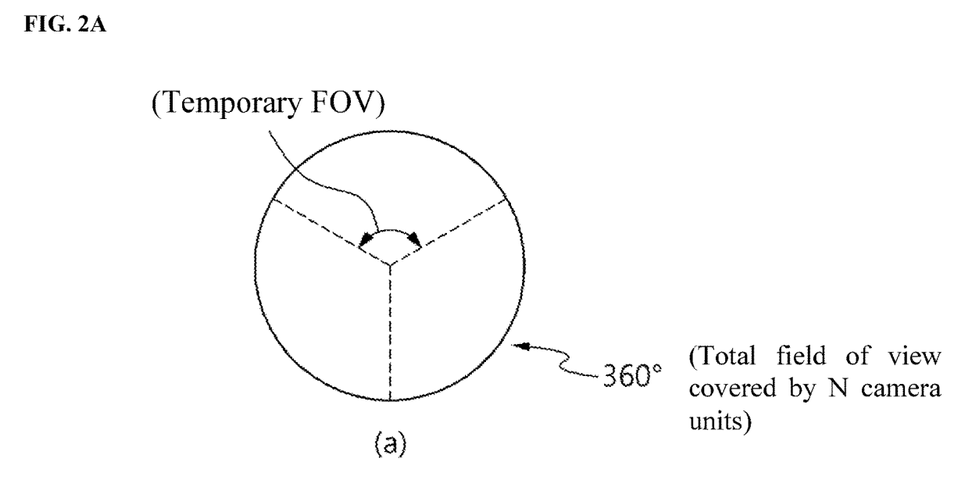
FIGS. 2A and 2B are diagrams illustrating a preferred example embodiment of a shooting field of view for shooting by a plurality of shooters according to the present disclosure.
Figure 2B:
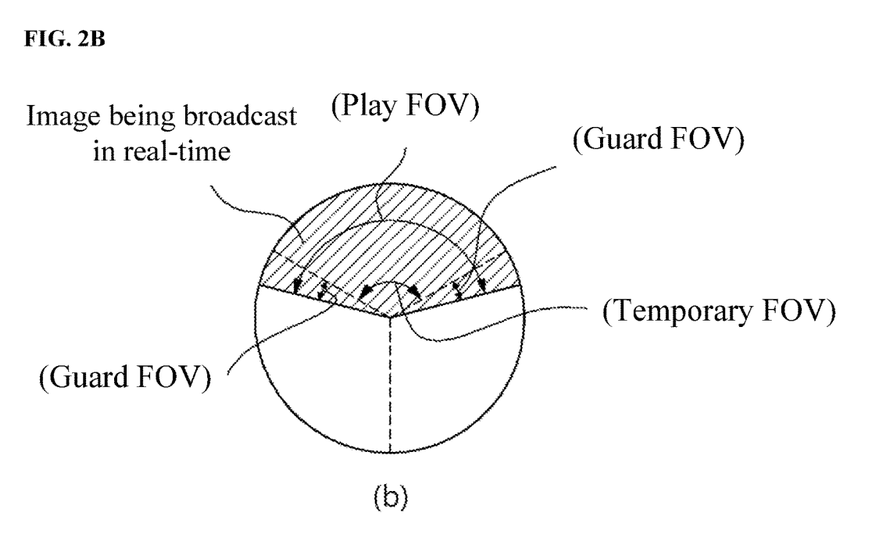

FIG. 1 is a diagram illustrating a preferred example embodiment of a real-time broadcasting device according to the present disclosure. FIGS. 2A and 2B are diagrams illustrating a preferred example embodiment of a shooting field of view for shooting by a plurality of shooters according to the present disclosure.

The real-time broadcasting device according to the present disclosure may implement real-time broadcasting of VR content by transmitting, to an user terminal, only an image of an shooter including a gaze direction of the user terminal, without stitching a plurality of VR images shot from the plurality of shooters. Hereinafter, example embodiments will be described in detail.

As can be seen from FIG. 1 and FIGS. 2A and 2B, a real-time broadcasting device 100 of the present disclosure includes a plurality of shooters 110, an image selector 120, an image transmitter 130, and a gaze direction receiver 140.

The plurality of shooters 110 include N camera units shooting different images at the same time. In a preferred example embodiment, the plurality of shooters 110 are disposed to shoot images at the same time in different directions from the same point.

The plurality of shooters 110 may be disposed to shoot a temporary field of view not be overlapped each other as shown in FIG. 2A. However, in a preferred example embodiment, the plurality of shooters 110 may be disposed to be overlapped each other by a predetermined guard field of view. When overlapped by the predetermined guard filed of view, there is an effect of controlling switching timing of the shooter in real-time broadcasting more comfortably.

As shown in FIG. 2B, the plurality of shooters 110 may include N camera units disposed to shoot images at the same in different directions from the same point. The N camera units may be configured to shoot the shooting field of view, which is a value obtained by adding a predetermined guard field of view to both sides of a temporary field of view obtained by dividing the total field of view covered by the N camera units by N. When the camera units are disposed in this way, the field of view shot by one camera unit is set to be overlapped with the field of view covered by the other camera units adjacent to both sides by a predetermined field of view.

For example, if a 360VR image is to be transmitted using three camera units, the temporary field of view of each camera unit will be 120 degrees. However, when both ends are further set to have a guard field of view of 15 degrees, the shooting field of view covered by one camera unit will be 150 degrees.

Further, the camera unit included in the plurality of shooters may include a pair of cameras for implementing 3D. The pair of cameras may be a camera for a right eye image and a camera for a left eye image, respectively.

The image selector 120 compares the shooting field of view covered by each of the plurality of shooters 110 and the gaze direction of a user terminal, and select an image of the shooter, among the plurality of shooters, which shoots images corresponding to the gaze direction of the user terminal.

There may be various example embodiments of a method for the image selector 120 to select the shooter to be transmitted in real time.

The user terminal has a unique field of view that a display device of the user terminal may cover, and it is defined as a play field of view. In addition, a specific direction that the user terminal looks at is defined as a gaze direction.

The image selector 120 may use the play field of view and the gaze direction received from the gaze direction receiver 140.

In a preferred example embodiment, the image selector 120 determines whether one end of the play field of view enters the guard field of view included in the shooting field of view of the shooter currently broadcasting in real time as the gaze direction of the user terminal changes. When it is determined that one end of the play field of view enters the guard field of view, the image selector 120 starts a procedure of determining whether one end of the play field of view satisfies a predetermined switching criterion. When it is determined that one end of the play field of view satisfies the predetermined switching criterion, the image selector 120 blocks the image of the shooter currently broadcasting in real time and switches the shooters so the image of the adjacent shooter is transmitted. Various example embodiments may exist for the predetermined switching criterion. In a preferred example embodiment, the switching criterion may be set as 1) the moment when one end of the play field of view entered the guard field of view, 2) the moment when one end of the play field of view reached a point corresponding to ½ of the guard field of view, but is not limited thereto.

The image transmitter 130 transmits a VR image shot by the shooter selected by the image selector to the user terminal in real time.

The gaze direction receiver 140 receives feedback about which direction the gaze direction of the user terminal viewing the VR image is, and transfers it to the image selector. The gaze direction receiver 140 may receive a play field of view unique to the user terminal corresponding to a unique range which may be played on a display device of the user terminal, and the user's gaze direction.

Figure 3:
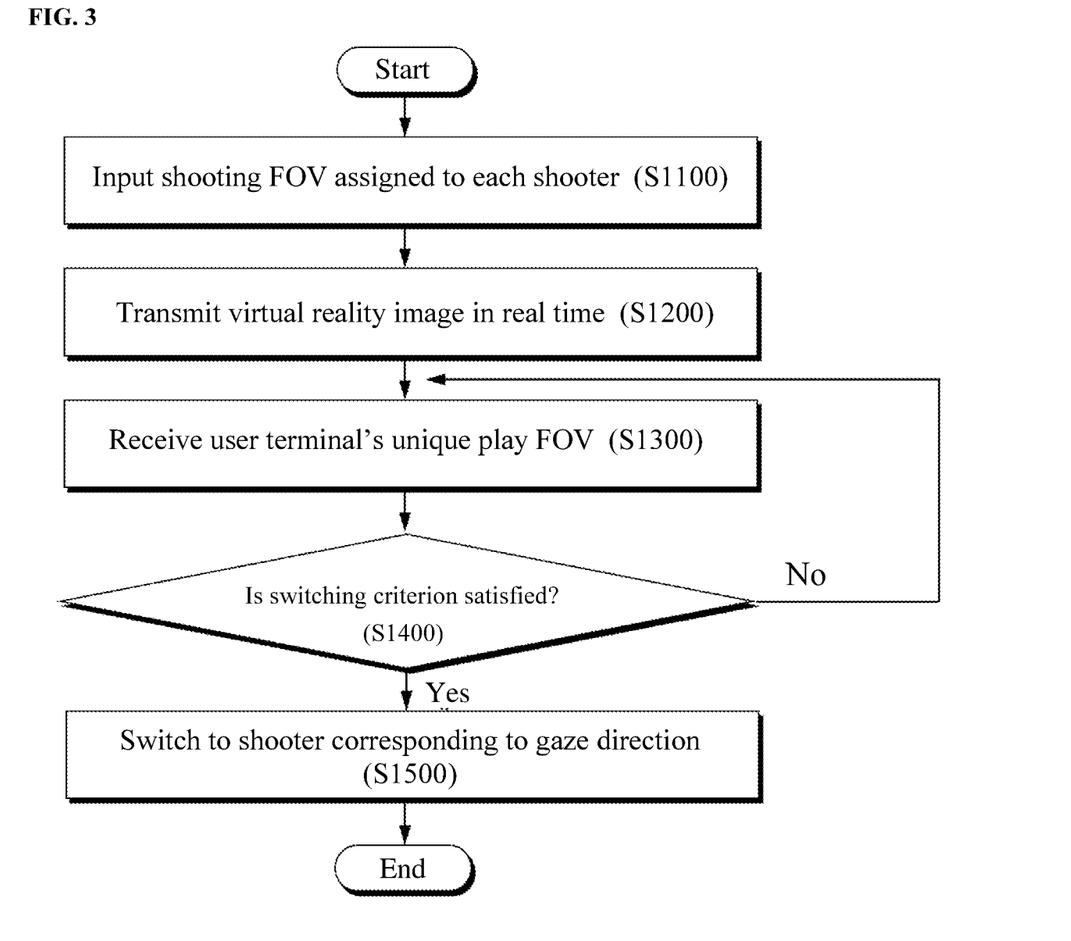
FIG. 3 is a diagram illustrating a preferred example embodiment of a real-time broadcasting method according to the present disclosure.

FIG. 3 is a diagram illustrating a preferred example embodiment of a real-time broadcasting method according to the present disclosure. The real-time broadcasting method of FIG. 3 is implemented by the real-time broadcasting device of the present disclosure.

As can be seen from FIG. 3, the real-time broadcasting method executes an operation of determining the shooting field of view shot by the camera unit included in the plurality of shooters (S1100).

In a preferred example embodiment, assuming that there are N camera units to take pictures in different directions at the same time in different directions from the same point, a value obtained by dividing the total field of view covered by the N camera units by N may be determined as a temporary field of view, It may be determined as a value obtained by adding a predetermined guard field of view to both sides of the temporary field of view.

When the shooting field of view is determined in this way, the field of view shot by one camera unit is overlapped the field of view covered by the other camera unit adjacent to both sides by a predetermined field of view.

Next, the image being shot by the shooter matching the gaze direction of the user terminal among the plurality of shooters is transmitted to the user terminal in real time (S1200).

At this time, the real-time broadcasting method of the present disclosure implements real-time broadcasting of VR content by transmitting, to the user terminal, only the image of the shooter including the gaze direction of the user terminal, without stitching a plurality of VR images shot from the plurality of shooters.

Next, the gaze direction of the user terminal and the play field of view unique to the user terminal which may be played by the user terminal are received from the user terminal (S1300).

Next, it is determined whether or not one end of the play field of view and the shooting field of view of the shooter currently broadcasting in real time satisfy a predetermined switching criterion as the gaze direction of the user terminal changes (S1400).

In a preferred example embodiment, whether the switching criterion is satisfied may be determined in the following way.

First, it is determined whether or not one end of the play field of view enters the guard field of view included in the shooting field of view of the shooter currently broadcasting in real time as the gaze direction of the user terminal changes.

When the one end of the play field of view enters the guard field of view, then a procedure of determining whether or not the one end of the play field of view satisfies the predetermined switching criterion starts.

On the contrary, the determination of whether or not the switching criterion is satisfied is stopped when the one end of the play field of view deviates from the guard field of view to reduce load.

When it is determined that the switching criterion is satisfied, the image of the shooter currently broadcasting in real time is blocked and the shooter is switched such that the image of the adjacent shooter is transmitted (S1500).

[How to Synchronize Frames of Image Played Before and After Switching]

If the image of the shooter being broadcast in real time is replaced, interruption of the image played in the user terminal may occur. In order to prevent this, in a preferred example embodiment of the present disclosure, it is possible to implement frame synchronization between the images before and after the switching by allowing images to be switched only in a key frame of the image of the shooter when the switching operation of the shooter starts.

A more detailed description of this is as follows.

A group of picture (GOP) means a set including at least one I-frame in MPEG image processing. Frames include I (Intra-coded), P (Predictive-coded), and B (Bidirectional-coded) frames. I-frames are key frames, and are encoded without reference to other frames. Accordingly, the I frame may be independently decoded without reference to other frames.

The P frame is coded with reference to previous I frame and P frame. The B frame is coded using both previous and subsequent I frames and P frames. Accordingly, it takes a considerable amount of time to decode the B frame.

Accordingly, when the frame of the image played after switching is frame B, the time required for decoding it may greatly increase, which may lead to synchronization failure.

Accordingly, the present disclosure maintains the time required for decoding within a predictable range by switching between images only in the key frame.

For this, a preferred example embodiment of the present disclosure shortens a key frame distance (KFD) of an image by using a predetermined method. In addition, when the played image is switched as the user's gaze changes, the image is switched only in the key frame among the frames forming the image, thereby implementing frame synchronization between the images before and after switching.

In an example embodiment, the KFD may be shortened by a method such that the B frame is not included in the image set. This is because the time required for decoding the B frame is considerable.

In addition, it is necessary to secure a predetermined delay time in order to perform the switching only at the key frame rather than an immediate switching. In other words, the switching should be delayed by a predetermined delay time, and an issue of the screen being played being cut off should not occur during the delay time. For this, in the present disclosure, such a delay time may be secured by setting the predetermined guard field of view and setting the switching criterion comfortably as described above.

[Real-Time Broadcasting of Wide Area Image, Patch Image, Etc.]

In a preferred example embodiment, the VR images transmitted in real time in the present disclosure is a concept including a wide area image, a patch image, and a division image.

Figure 4A:
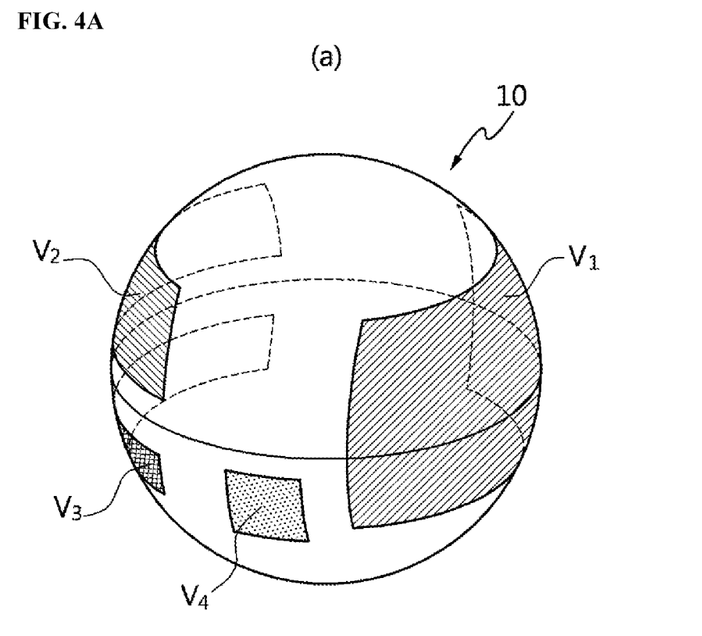
FIGS. 4A and 4B are diagrams for explaining the concept of a wide area image, a patch image, and a plurality of division images according to the present disclosure.
Figure 4B:
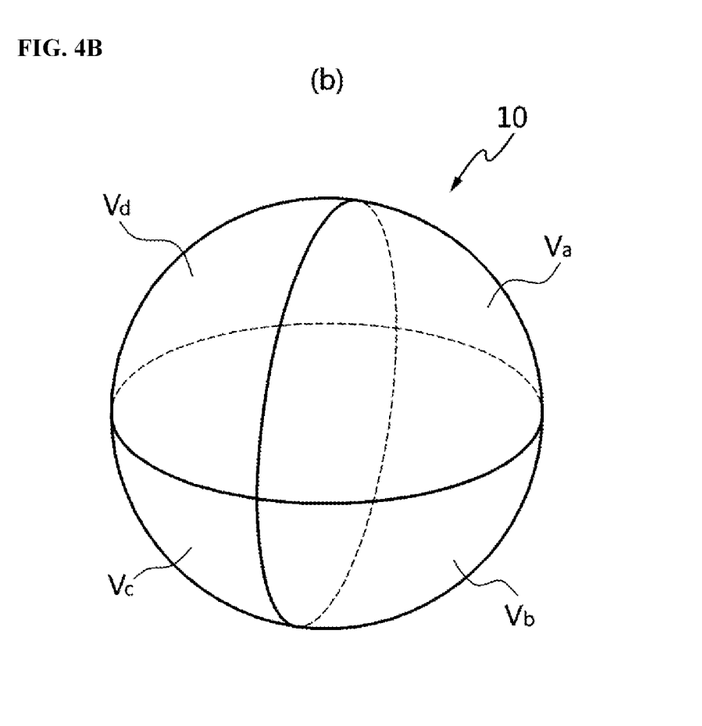

FIGS. 4A and 4B are diagrams for explaining the concept of a wide area image, a patch image, and a plurality of division images according to the present disclosure.

The concept of the wide area image and the patch image of the present disclosure will be described with reference to FIG. 4A. Assuming that an entire 360-degree VR area 10 is expressed as a sphere, a wide area image $V_0$ is an image representing the entire 360-degree VR area 10 or a wider area than the patch image. Hereinafter, for convenience, the wide area image will be described as covering the entire VR area, but is not necessarily limited thereto.

A patch image $V_{1-3}$ is an image representing a part of the VR area 10 of 360 degrees. The patch image $V_{1-3}$ may have different areas to cover, different spaces, and different image quality. For example, a first patch image $V_1$ may be a high-quality image that covers upper and lower partial areas of the front part. If a VR content is a musical, the first patch image $V_1$ may be an area covering a stage of the musical. A second patch image $V_2$ may be an image that covers an upper partial area of the rear part, and a third patch image $V_3$ may be an image that covers a lower partial area of the rear part.

The patch image $V_{1-3}$ is played by being overlapped or patched on the wide area image $V_0$. Therefore, even if any one of the played patch images $V_{1-3}$ is off as needed, no space is generated in the image because the wide area image $V_0$ is played behind.

The patch image $V_{1-3}$ is played in synchronization with the wide area image $V_0$. This is because the patch image $V_{1-3}$ may cause dizziness to the user if synchronization of the wide area image $V_0$ is not implemented.

Asynchronous content $V_4$ means content that is randomly inserted by the intention of a creator regardless of the plurality of VR images. The asynchronous content $V_4$ may be a moving picture or a specific event action. In terms of content, it may be an advertisement, or it may be an event related to the VR image.

The asynchronous content $V_4$ is not synchronized with the plurality of VR images. In other words, regardless of the sync between the patch image $V_{1-3}$ and the wide area image $V_0$, it is played or operated according to separate trigger information. In a preferred example embodiment, the trigger information includes information on whether the user's gaze looks at the position of the asynchronous content $V_4$.

The concept of a division image $V_{1-N}$ of the present disclosure will be described with reference to FIG. 4B (N is a natural number greater than 1).

In an example embodiment, the division image $V_{1-N}$ may be an image divided into N areas not overlapped each other. The plurality of division images $V_{1-N}$ may have different sizes and different image quality.

Since the images overlapped each other by the predetermined guard field of view have been described with reference to FIGS. 2A and 2B, repeated descriptions thereof will be omitted.

It is apparent to those skilled in the art that the present disclosure may be embodied in other specific forms without departing from the features of the present disclosure. Accordingly, the above detailed description should not be construed as restrictive in all respects but as illustrative. The scope of the present disclosure should be determined by a reasonable construction of the appended claims, and all modifications within the equivalent scope of the present disclosure are included in the scope of the present disclosure.

What is claimed is:

1. A real-time broadcasting device for virtual reality (VR) images, wherein the device is for real-time broadcasting of VR images input from a plurality of cameras, comprising:
   a plurality of image shooters disposed to shoot images in different directions from the same point at the same time;
   an image selector configured to compare a field of view covered by each of the plurality of shooters and a gaze direction of an user terminal to select an image of a shooter shooting an image corresponding to the gaze direction of the user terminal among the plurality of shooters;
   an image transmitter configured to transmit a VR image shot by the shooter selected by the image selector to the user terminal in real time; and
   a gaze direction receiver configured to receive feedback on which direction the gaze direction of the user terminal for viewing a VR image is, and transmit the gaze direction to the image selector,
   wherein the real-time broadcasting device is configured to implement real-time broadcasting of VR content by transmitting, to the user terminal, only the image of the shooter in which the gaze direction of the user terminal is included, without stitching a plurality of VR images shot from the plurality of shooters, in order to secure real-time performance.

2. A real-time broadcasting method for broadcasting in real time using the real-time broadcasting device for VR images of claim 1, wherein the method is for real-time broadcasting of VR images input from a plurality of cameras, comprising:
   (a) determining a shooting field of view shot by a camera unit included in a plurality of shooters;
   (b) transmitting an image which is being shot by a shooter matching a gaze direction of an user terminal among the plurality of shooter to the user terminal in real time;
   (c) receiving the gaze direction of the user terminal and a play field of view unique to the user terminal which is able to be played by the user terminal;
   (d) determining whether or not one end of the play field of view and a shooting field of view of a shooter currently broadcasting in real time satisfy a predetermined switching criterion as the gaze direction of the user terminal changes; and
   (e) blocking an image of the shooter currently being broadcast in real time and switching the shooter such that an image of an adjacent shooter is transmitted if the switching criterion is satisfied, wherein the real-time broadcasting method implements real-time broadcasting of VR content by transmitting, to the user terminal, only the image of the shooter in which the gaze direction of the user terminal is included, without stitching a plurality of VR images shot from the plurality of shooters, in order to secure real-time performance.

* * * * *